United States Patent [19]

Chiu

[11] 4,278,694

[45] Jul. 14, 1981

[54] MODIFIED LIQUID SMOKE COMPOSITIONS AND FOOD CASINGS PREPARED THEREFROM

[75] Inventor: Herman S. Chiu, Chicago, Ill.

[73] Assignee: Union Carbide Corporation, New York, N.Y.

[21] Appl. No.: 73,298

[22] Filed: Sep. 7, 1979

Related U.S. Application Data

[63] Continuation of Ser. No. 904,283, May 9, 1978.

[51] Int. Cl.³ .......................... A22C 13/00; A23L 1/22
[52] U.S. Cl. ................................. 426/135; 426/138; 426/140; 426/314; 426/330; 426/533; 426/650
[58] Field of Search ............... 426/138, 133, 650, 651, 426/314, 315, 652, 425, 646, 235, 429, 272, 135, 330, 302, 533, 105, 90

[56] References Cited

U.S. PATENT DOCUMENTS

| | | | |
|---|---|---|---|
| 4,104,408 | 8/1978 | Chiu | 426/650 |
| 4,136,206 | 1/1979 | Kulesza | 426/650 |
| 4,154,866 | 5/1979 | Dainius | 426/650 |

*Primary Examiner*—Jeanette M. Hunter
*Attorney, Agent, or Firm*—John C. LeFever

[57] ABSTRACT

Aqueous liquid smoke compositions used to prepare food casings which are suitable for imparting smoke flavor and color to food products processed therein.

35 Claims, No Drawings

MODIFIED LIQUID SMOKE COMPOSITIONS AND FOOD CASINGS PREPARED THEREFROM

This application is a continuation of our prior U.S. application Ser. No. 904,283 Filing Date May 9, 1978.

The present invention relates to improved food casings and more particularly to food casings that impart "smoke" flavor and color to food products processed therein by employing a novel modified liquid smoke composition as a coating over the surface thereof.

Tubular food casings are used extensively for processing a great variety of meat products and other food items. The food casings are generally thin-walled tubing of various diameters prepared from reconstituted materials, and particularly cellulose derivatives such as regenerated cellulose. Food casings may also be prepared with fibrous webs embedded in the wall thereof, such casings commonly being referred to as "fibrous food casings".

The many different recipes and modes of processing that are used by the processed food industry to suit different tastes and even regional preferences generally necessitates the use of food casings with a variety of characteristics. In some instances, for example, food casings are required to have multifunctional uses wherein they serve as containers during the processing of a food product encased therein and then also serve as a protective wrapping for the finished product. In the processed meat industry, however, the food casings used in the preparation of many types of meat products, such as various types of sausages, beef rolls, hams and the like, are frequently removed from about the processed meat product prior to slicing and/or final packaging.

Surface appearance and flavor are important factors in the commercial and consumer acceptance of most processed meat products and a common feature of most varieties of such products, involves the use of "smoking" for imparting characteristic flavor and color thereto. In the past, the "smoking" of food products was generally accomplished by the food processors subjecting the food product to actual contact with smoke in a gaseous or cloud-like form. Such "smoking" processes, however, have been considered unsatisfactory for a variety of reasons including the inefficiencies and lack of uniformity of the "smoking" operation. Because of the shortcomings experienced, the trend has been to employ various types of liquid aqueous solutions of smoke flavors commonly called "liquid smoke solutions", or "as is" liquid smoke, that have been developed and used commercially by the food processor in the processing of many types of meat and other food products.

The application of "liquid smoke solutions" to meat products is generally carried out in a variety of ways, including spraying or dipping an encased food product during the processing thereof or by incorporating the "liquid smoke solution" in the recipe itself. The actual operation of "smoking" by spraying or dipping is not completely satisfactory due to the equipment expenses and limited degree of control that has been found and incorporation of "liquid smoke solutions" in the meat recipe does not always provide the desired surface appearance because of dilution of smoke ingredients.

It has also been suggested, as for example disclosed in U.S. Pat. No. 3,330,669 to Hollenbeck, that application of a viscous liquid smoke solution to the inside surface of a tubular food casing by the food processor prior to the stuffing thereof with a sausage emulsion results in preparation of processed food products that after cooking and removal of the casing exhibit good color and smoky flavor. However, the Hollenbeck procedure has not been found practical and is not used commercially. Heretofore, however, it has been found that providing casings to afford special treatment or structural characteristics to the food product can be more uniformly and economically accomplished by the casing manufacturer. This is especially true with the advent and wide commercial use of automatic stuffing and processing equipment in the processed food industry.

Several methods of providing food casings with coatings applied to a surface thereof are known and described in the patent literature. There is disclosed, for example, in U.S. Pat. No. 3,451,827 a spraying method for applying a variety of coating materials over the internal surface of small diameter casings and in U.S. Pat. No. 3,378,379 to Shiner et al, a "slugging" method used for applying coating materials to the internal surface of large diameter casings. While such techniques and others have been used in preparing commerical quantities of a variety of coated food casings, including casings where liquid smoke is employed as a component in the coating composition, the casings produced thereby have been designed to meet particular commercial requirements and, to the best of our knowledge, none of the coated casings disclosed have been known to successfully impart a satisfactory level of "smoke" flavor and color to a meat product processed therein. For example, in U.S. Pat. Nos. 3,360,383 to Rose et al, and 3,383,223 and 3,617,312 to Rose there are disclosed coating compositions of various protein materials, such as gelatin, that employ liquid smoke solutions in amounts specifically required to insolubilize the protein materials. Such coated casings are disclosed as exhibiting special adhesion properties required for the processing of dry sausages which properties would therefore limit the suitability thereof for many other casing applications.

Moreover, as is well known, commercially available liquid smoke solutions are highly acidic, generally having a pH of 2.0 to 2.5, though some commercial products are supplied in partially neutralized form with a pH of 4.5 to 5.0, and as disclosed in U.S. Pat. No. 3,467,527 to Wistreich, an oil extract of liquid smoke solution may be provided having a pH in the range between 5.5 and 8.5. The highly acidic nature of aqueous liquid smoke solutions has, herefore, been essential to maintain all the smoke flavor and/or color constituents in solution, since neutralization to a pH greater than about 5 results in the insolubilization and separation of some of the important constituents thereof.

The problems of using highly acidic materials in conjunction with cellulosic materials have been studied over the years and the detrimental effects thereof on the cellulose polymeric structure, which generally results in a loss of strength, is well known. It has been found that such effects are also prevalent with cellulosic food casings which adds to the general undesirability of using highly acidic materials with food products. It is known, for example, that while manufacturing procedures generally employed in the preparation of food casings involves treatment with highly acidic materials, extensive washing and neutralization treatments are used to assure that the casings are in a substantially neutral condition when packaged for storage or for shipment to a food processor.

Commercially available liquid smoke solutions, in addition to being highly acidic, also contain rather low concentrations of smoke flavoring and coloring constituents which are kept in solution by the highly acidic nature of the aqueous liquid smoke solution. At these low levels of concentration, commercially available liquid smoke solutions, on being used to coat food casing such as in a conventional squeeze roll set-up or in a conventional doctor roll set-up, do not provide sufficient smoke flavoring and coloring constituents to the casing surface for transfer to the surface of a meat product which is subsequently stuffed in the casing. Acceptable smoke flavor and color is not developed on the encased meat product. In addition, if a commercially available liquid smoke solution is coated on a casing by spraying, excessive amounts of water may be added to the casing.

Hollenbeck, in U.S. Pat. No. 3,330,669 noted above, teaches thickening commercially available "as is" liquid smoke solutions with water soluble gums for coating food containers and casings. Because of the much higher viscosity of the coating solution, as compared with the commercially available "as is" liquid smoke solution, it is then possible to form a thick layer of coating on the casing surface by spraying or by free draining, whereby the flavoring and coloring level is increased to a noticeable extent. Even employing such a technique, the casing still cannot pick up an appreciable amount of smoke flavoring and coloring constituents, if the casing is to go through a set of squeeze rolls to doctor off any excess coating in order to control coating thickness or, if the casing passes through squeeze rolls during drying of the casing in an inflated condition. It would be advantageous to modify the concentration of the liquid smoke constituents in solution, in order to provide a concentrated liquid smoke which could be used in a coating operation such as one which employs squeeze rolls or doctoring rolls, rather than to modify the viscosity of the "as is" liquid smoke as taught by Hollenbeck.

Dry smoke flavoring powders obtained by spray-drying liquid smoke solutions in a malto-dextrin carrier are commercially available and a concentrated aqueous liquid smoke solution can be prepared therefrom, but such concentrated solutions are undesirably too sticky and unsuitable for coating casing, because of excessive blocking of the casing and because of jamming on the shirring mandrel due to friction, if the casing is shirred.

Preparation of tubular food casings that could be used in the manufacture of a variety of processed food products and that would impart a desired level of smoke color and flavor to the processed food product would be highly desirable. Therefore, development of a liquid smoke suitable for use in the preparation of such casings would be most advantageous, particularly if it was provided in a concentrated and less acidic condition, thereby avoiding the disadvantages associated with the use of less concentrated and highly acidic materials with cellulosic food casings and with food products generally.

The concentration of commercially available liquid smoke solutions by evaporation in "as is" condition is not satisfactory, because it yields a final concentrated solution which is still highly acidic. Such a concentrated solution is not suitable for casing treatment, because its acidity can cause cellulose degradation upon heating or prolonged storage. In the practice of the present invention, this problem is overcome by adding a sufficient amount of a water soluble solubilizing agent to the "as is" liquid smoke solutions before evaporating to concentrate. When this is done, the liquid smoke solution can be concentrated such as by boiling to as much as one-fifth of its original volume without solid precipitation and the resultant composition has a pH in the range of about 4 to about 5, because an appreciable amount of the acidic constituents are vaporized off at higher evaporation temperatures. The pH of this resultant composition if desired, can then be further adjusted to a desired higher pH with an alkaline neutralizing agent. Alternatively, the initial "as is" highly acidic liquid smoke solution can be substantially neutralized first with an alkaline neutralizing agent in the presence of a water soluble solubilizing agent and then the substantially neutralized liquid smoke composition is concentrated by evaporation at room temperature or at an elevated temperature to from about one-third to about one-fifth of its original volume.

Alternatively, a concentrated solution of smoke constituents can be prepared without the need of evaporation. In this instance, the "as is" acidic liquid smoke solution is substantially neutralized with an alkaline neutralizing agent, without the prior addition of a water soluble solubilizing agent. When such a substantially neutralized liquid smoke composition is allowed to stand, smoke tars will settle out at the bottom of the composition and can be separated therefrom by decantation or other suitable means, such as filtration or centrifugation. The smoke tars are then dissolved in a water soluble solubilizing agent, and if desired, diluted with other additives for processing use.

In accordance with the present invention there is provided an aqueous modified liquid smoke composition, hereinafter referred to as "concentrated substantially neutralized liquid smoke", that is in a substantially neutralized and concentrated condition having a pH greater than about 4, and that is suitable to impart smoke color and flavor characteristics to a cellulosic food casing and to food products processed therein, comprising an aqueous solution of at least about 15% by weight of smoke coloring and flavoring constituents, a salt of an alkaline neutralizing agent, and an amount of a water soluble solubilizing agent such as a water soluble short carbon chain alcohol, sufficient to maintain said smoke constituents in solution. It has been discovered that the concentrated substantially neutralized liquid smoke solution of the present invention may be applied to the surface of a cellulosic food casing in an amount that will be suitable for imparting smoke flavor and color characteristics to said food casing and to a wide variety of meat products processed therein.

There is also provided in accordance with the present invention methods of preparing concentrated substantially neutralized liquid smoke compositions having a pH of greater than about 4, that may be used in the preparation of tubular cellulosic food casings, comprising substantially neutralizing a "liquid smoke solution" with an alkaline neutralizing agent to a pH greater than about 4 in the presence of an amount of a water soluble solubilizing agent, such as a water soluble short carbon chain alcohol, that is sufficient to maintain the smoke coloring and flavoring constituents in solution, and then concentrating the substantially neutralized liquid smoke by evaporation at room temperature or at elevated temperatures. The preparation of a substantially neutralized liquid smoke composition suitable for use in this invention is disclosed in co-pending U.S. application Ser. No. 783,425 to H. S. Chiu, filed Mar. 31, 1977, now U.S. Pat. No. 4,104,408.

In accordance with the present invention there is also provided an aqueous modified liquid smoke composition, hereinafter referred to as "concentrated liquid smoke", that is in a generally concentrated condition having a pH greater than about 4, and that is suitable to impart smoke color and flavor characteristics to a cellulosic food casing and to food products processed therein, comprising an aqueous solution of at least about 15% by weight of smoke coloring and flavoring constituents, and a water soluble solubilizing agent, preferably a water soluble short carbon chain polyhydric alcohol having a boiling point of at least about 130° C. in an amount sufficient to maintain said smoke constituents in solution. It has been discovered that the concentrated liquid smoke solution of the present invention may be applied to the surface of a cellulosic food casing in an amount that will be suitable for imparting smoke flavor and color characteristics to said food casing and to a wide variety of meat products processed therein.

There is also provided in accordance with the present invention a method of preparing concentrated liquid smoke compositions having a pH of greater than about 4 that may be used in the preparation of tubular cellulosic food casings comprising admixing a "liquid smoke solution" with an amount of a watersoluble solubilizing agent, preferably a water soluble short chain polyhydric alcohol having a boiling point of at least about 130° C., that is sufficient to maintain the smoke coloring and flavoring constituents in solution and then concentrating the solution, such as by evaporation at elevated temperatures by boiling.

There is also provided in accordance with the present invention an alternative method of preparing a concentrated substantially neutralized liquid smoke composition having a pH of greater than about 4, comprising adding an alkaline neutralizing agent to a "concentrated liquid smoke" of the present invention to raise its pH to a desired level.

In accordance with the present invention there is also provided an aqueous liquid smoke composition, hereinafter referred to as "smoke tars liquid smoke", that is in a substantially neutralized and concentrated condition, having a pH greater than about 4, and that is suitable to impart smoke color and flavor characteristics to a cellulosic food casing and to food products processed therein, comprising a solution of at least about 15% by weight of smoke coloring and flavoring constituents derived from smoke tars, and an amount of a water soluble solubilizing agent sufficient to maintain said smoke constituents in solution. It has been discovered that the smoke tars liquid smoke solution of the present invention may be applied to the surface of a cellulosic food casing in an amount that will be suitable for imparting smoke flavor and color characteristics to said food casing and to a wide variety of meat products processed therein.

There is also provided in accordance with the present invention a method of preparing smoke tars liquid smoke compositions having a pH of greater than about 4 that may be used in the preparation of tubular cellulosic food casings comprising substantially neutralizing a "liquid smoke solution" with an alkaline neutralizing agent, separating precipitated smoke tars from the substantially neutralized composition, and then dissolving the smoke tars in a water soluble solubilizing agent.

There is also provided in accordance with the present invention a tubular food casing that is suitable to impart smoke flavor and color to food products processed therein comprising a tubular cellulosic food casing having a coating over a surface thereof comprising an admixture of a modified liquid smoke having smoke coloring and flavoring constituents in an amount of at least about 0.5 mg/in$^2$, and preferably at least about 3 mg/in$^2$, of casing surface, and a water soluble solubilizing agent for said smoke constituents. The coating may additionally comprise a salt of an alkaline neutralizing agent. It has been discovered that the tubular food casing of the present invention will not be degraded during extended periods of storage by the presence of liquid smoke constituents on the surface thereof, and, further, that such casings may be prepared in the form of shirred casing sticks, or as short segments of flattened tubing, and the like.

The term "modified liquid smoke" as used herein encompasses the terms "concentrated liquid smoke", "concentrated substantially neutralized liquid smoke", and "smoke tars liquid smoke" individually or in mixtures thereof.

The term "substantially neutralized" as used herein is intended to refer to compositions having a pH within the range of about 4 to about 8. Preferably, such compositions have a pH within the range of about 6 to about 8.

The term "smoke tars" are used herein encompasses the precipitate separated from an aqueous liquid smoke substantially neutralized in the absence of a sufficient amount of a solubilizing agent to maintain the smoke tars in solution.

The term "solution" as used herein is meant to encompass homogeneous true solutions, emulsions, collidal supensions and the like. The term "solution" is not meant to encompass the "smoke tars" precipitate.

Smoke coloring and flavoring constituents suitable for use in accordance with the present invention are generally those designated as being the coloring and flavoring constituents of "liquid smoke" which is a well known class of materials also commonly referred to as "liquid smoke solutions" or "as is" liquid smoke. Various "liquid smokes" are known, all of which are believed suitable for use in the present invention.

Liquid smoke often is a solution of natural wood smoke constituents prepared by burning a wood, for example, a hickory or a maple, and capturing the natural smoke constituents in a liquid medium such as water. Alternatively, the liquid smoke to be used may be derived from the destructive distillation of a wood, that is, the breakdown or cracking of the wood fibers into various compounds which are distilled out of the wood residue. Liquid smokers are generally very acidic, usually having a pH of 2.5 or less and a titratable acidity of at least 3%, although some partially neutralized liquid smokes, having a pH up to about 5, are also available. Reference to the term "smoke coloring and flavoring constituents", as used throughout this specification and in the appended claims with respect to the modified liquid smoke compositions and casings of the invention, is intended to refer to, and should be understood as referring to, the smoke coloring and flavoring constituents derived from liquid smoke solutions in their present commercially available form. The term "smoke flavoring and coloring constituents", as used herein, is intended to be synonymous with the term "smoke solids"

which is the term commonly used by the suppliers of commercial liquid smokes.

The liquid smoke that is preferred for use with this invention is a solution of natural wood smoke constituents. This liquid smoke is produced by the limited burning of hardwoods and the absorption of the smoke so generated into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood constituents are absorbed into the solution in a balanced proportion and the undesirable constituents may be removed. The resultant liquid smoke solution is representative of the whole preferred spectrum of smoke colors and flavors without a preference of any one type. The apparatus and method for manufacturing typical liquid smokes of the preferred type is more fully described in U.S. Pat. Nos. 3,106,473 to Hollenbeck and 3,873,741 to Melcer et al.

Certain liquid smokes have been approved for use in foods by the U.S. Food and Drug Administration and the Meat Inspection Division of the U.S. Department of Agriculture. Exemplary of suitable commercially available liquid smokes are CHARSOL from Red Arrow Products Co.; LIQUID HICKORY SMOKE from Hickory Specialties, Inc.; GRIFFITH'S NATURAL SMOKE FLAVOR from Griffith Laboratories, Inc.; and SMOKAROMA LIQUID SMOKE CODE 10 from Meat Industry Suppliers, Inc.

Alkaline neutralizing agents suitable for use in accordance with the invention are any of the well known water soluble alkaline materials such as, for example, potassium hydroxide, sodium hydroxide, ammonium hydroxide, sodium carbonate, sodium bicarbonate, sodium phosphate, disodium hydrogen phosphate, and the like. The alkaline materials may be in solid form or as a concentrated solution thereof. The most highly alkaline materials are most advantageously employed in order that the concentration of smoke constituents will be maintained as high as possible in a substantially neutralized solution thereof.

Among suitable water soluble solubilizing agents for use in accordance with the invention are short chain monohydric and polyhydric alcohols that are water-soluble, non-toxic, and preferably are approved for use in a food related application. Exemplary of suitable materials are ethyl alcohol, glycerine, propylene glycol, triethylene glycol and the like.

If used in an embodiment of the invention, the amount of alkaline neutralizing agent employed in an aqueous solution of smoke constituents is largely determined by the acidity and composition of the particular liquid smoke solution that is initially employed and the method of concentration.

The amount of a water soluble solubilizing agent that is employed in the embodiments of this invention is largely determined by the composition of the particular liquid smoke that is used, the desired pH, and the extent of concentration of the modified liquid smoke compositions of the invention, but in general the solubilizing agent will be present where employed in an amount sufficient to keep the smoke constituents in solution. In the preparation of either a concentrated substantially neutralized liquid smoke composition or a concentrated liquid smoke composition the amount of a water soluble solubilizing agent that should be present is at least about 11% by weight of the "as is" liquid smoke solution initially employed, and at least about 30% by weight of the final concentrated liquid smoke or concentrated substantially neutralized liquid smoke. In the preparation of a smoke tars liquid smoke composition the amount of a water soluble solubilizing agent that should be present is that amount sufficient to dissolve the smoke tars. The amount of solubilizing agent that may be present in excess of that actually required may vary over a wide range, but it is generally desirable that the smoke coloring and flavoring constituents should be in as high a concentration as possible and amounts of solubilizing agent greatly in excess of that actually required would unnecessarily dilute the concentration thereof.

The aqueous concentrated substantially neutralized liquid smoke compositions of the present invention are, in general, prepared by admixing a sufficient amount of a water soluble solubilizing agent with a commercially available "as is" liquid smoke solution and then admixing an alkaline neutralizing agent therewith until a desired pH of greater than about 4 is attained, preferably a pH between about 6 and about 8, and then concentrating the substantially neutralized composition by evaporation at room temperature or at elevated temperatures down to from about one-third to about one-fifth of the original volume. Alternatively, the concentrated substantially neutralized liquid smoke composition may be prepared by adding an alkaline neutralizing agent to a concentrated liquid smoke of the present invention to raise its pH to a desired level. In an alternative, but not as advantageous procedure, the concentrated substantially neutralized liquid smoke compositions of the invention may be prepared by first substantially neutralizing the liquid smoke to a desired pH and then admixing therewith an amount of a water soluble solubilizing agent sufficient to obtain a clear solution thereof, and then concentrating to desired levels.

The substantially neutralized liquid smoke composition before concentration comprises an aqueous solution with a pH greater than about 4 of the smoke coloring and flavoring constituents of aqueous "as is" liquid smoke solutions as hereinabove described; a salt of an alkaline neutralizing agent, and a water soluble solubilizing agent in an amount sufficient to prevent said smoke constituents from separating out.

The aqueous concentrated liquid smoke compositions of the present invention are, in general, prepared by admixing an amount of a water soluble solubilizing agent, sufficient to keep smoke constituents in solution, with a commercially available "as is" liquid smoke solution and then concentrating preferably by boiling at elevated temperatures down to about one-third to about one-fifth of the original volume. The water soluble solubilizing agent, used to prepare the concentrated liquid smoke, preferably has a boiling point of at least about 130° C. and is preferably a short chain polyhydric alcohol. Sufficient acidic components of the liquid smoke solution should be evaporated off in order to obtain a pH of greater than about 4. The higher the boiling point of the solubilizing agent, more of the higher boiling acidic components will be removed. The pH of the resulting concentrated smoke composition may be adjusted to a higher pH, if desired, by the addition of a neutralizing agent.

The smoke tars liquid smoke compositions of the present invention are, in general, prepared by substantially neutralizing an "as is" liquid smoke solution without the prior addition of water soluble solubilizing agent, separating the smoke tars which settle out by decantation or other suitable means such as filtration or centrifugation, and then dissolving the separated smoke tars in a water soluble solubilizing agent.

Various methods of concentrating by reduction of the water component of the substantially neutralized liquid smoke solution may be employed in the practice of this invention including, but not limited to, vaporization by room temperature evaporation in a low humidity environment, and boiling at elevated temperature. The former method is preferred in order to avoid loss of the more volatile components. Other methods of concentration which may be employed include among others, "freeze-drying" and "spray-drying". With respect to the preparation of the concentrated liquid smoke compositions of this invention which are not substantially neutralized with an alkaline neutralizing agent before concentration, the preferred method of concentration is by boiling at elevated temperatures, because along with a reduction of the water component of the liquid smoke, volatile acidic components are also vaporized off at the elevated temperatures, thereby resulting in a less acidic concentrated liquid smoke. A method for preparing a smoke tars liquid smoke employs precipitation and decantation as already noted, but other suitable methods may be employed.

The modified liquid smoke compositions of the present invention may also contain other ingredients such as, for example, viscosity control agents, coating aids, and ingredients that may be suitably used in treating an article such as a tubular food casing, to which the smoke constituents will be applied.

Modified liquid smoke compositions of the invention have been found to be advantageously employed as a coating material for food casings that may be used to impart smoke color and flavor characteristics to a variety of food products processed therein.

Accordingly, in accordance with the present invention, there is provided a tubular food casing having a coating over a surface thereof comprising an admixture of a modified liquid smoke having smoke coloring and flavoring constituents in an amount of at least about 0.5 mg/in$^2$, and preferably at least about 3 mg/in$^2$, of casing surface, and a water soluble solubilizing agent for said smoke constituents. The coating may additionally comprise a salt of an alkaline neutralizing agent.

Tubular food casings that are suitable for use in the casings of the present invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like in a variety of diameters. Also suitable are tubular cellulosic casings having a fibrous reinforcing web embedded in the wall thereof which are commonly called "fibrous food casings", as well as cellulosic casings without fibrous reinforcement, and casings prepared from reconstituted materials such as collagen and the like. Also suitable are polyvinyl alcohol casings either with or without fibrous reinforcement.

If fibrous cellulosic, collagen or polyvinyl alcohol casings are coated with a modified liquid smoke of this invention, it is preferred but not mandatory that the modified liquid smoke have a pH of greater than about 4, because they, unlike nonfibrous cellulosic casing, are not as degraded by an excessively acidic environment. Accordingly, since higher boiling acidic components need not be removed, a concentrated liquid smoke may be prepared using a water soluble solubilizing agent having a boiling point lower than about 130° C., if it is used to coat a fibrous cellulosic, collagen or polyvinyl alcohol casing.

Smoke coloring and flavoring constituents suitable for use in accordance with the invention are those known constituents of commercially available "liquid smokes" that afford smoke flavor and/or color characteristics to various types of food products. Various "liquid smokes", as hereinabove described, are known and all of these are believed suitable for use in the invention. The concentrated liquid smoke compositions, or the concentrated substantially neutralized liquid smoke compositions, or the smoke tars liquid smoke compositions of the present invention or combinations thereof may be advantageously employed as a source of suitable smoke coloring and flavoring constituents.

The modified liquid smoke compositions of the present invention generally have pH's in the range from about 4 to about 8 and smoke flavoring and coloring constituents of about 15% by weight and higher as contrasted to commercially available "as is" liquid smoke solutions which have pH's on the order of 2-2.5 and a total smoke constituents content of only about 10% and less.

The amount of smoke constituents that should be present on the food casing of the present invention would depend on the desired flavor and/or color characteristics to be imparted to the food casing or to food products processed therein and may vary over a wide range. The amount present, therefore, is largely determined by the composition and concentration of smoke constituents in the particular "as is" liquid smoke solution initially employed, which affects the composition and concentration of the smoke constituents in the modified liquid smoke compositions of the present invention, but, in general, the food casing should have coated on it at least about 0.5 mg of smoke coloring and flavoring constituents per square inch of casing surface and preferably at least about 3 mg/in$^2$ of smoke constituents. The amount of a salt of an alkaline neutralizing agent present in the coating will largely depend on the amount of the alkaline neutralizing agent used to prepare the modified liquid smoke coated on the casing. The amount of water soluble solubilizing agent, that should be present in the coating is not critical and will depend on the amount of smoke constituents that are present.

Preferably, the coating which contains the smoke constituents will be present primarily as a coating over the inner surface of the food casing but, if desired, the coating may be present as a coating on the inner and outer surfaces of the casings or as a coating only on the outer surface thereof, if the casing is to be turned inside out before stuffing.

Other ingredients which are normally used in the manufacture of, or for further treatment of the food casings, e.g., cellulose ethers, mineral oil, etc., may also be present if desired, and they will be used in the same manner and amounts as if the smoke constituent coating admixture had not been used. Also present, are other ingredients that may, for example, be used in a modified liquid smoke coating composition as viscosity control agents and the like, e.g., commercial sugars, cellulose ethers, carboxymethyl cellulose, and the like.

Food casings of the present invention may be prepared by application of a modified liquid smoke composition of the present invention to a surface of suitable tubular food casings by using any one of a number of well known methods. Thus, for example, a modified liquid smoke composition can be introduced into the tubular casing in the form of a "slug" of liquid, in a manner similar to that disclosed, for example, in U.S. Pat. No. 3,378,379 to Shiner et al, and advancing the casing past the liquid slug coats the inner surface thereof. Alternatively, the modified liquid smoke composition may be applied to the internal surface of the casing through a hollow mandrel over which the casing is advancing as, for example, a shirring machine mandrel in a manner similar to that described in U.S. Pat. No. 3,451,827 to Bridgeford. The modified liquid smoke composition may also be applied to a casing surface by well known dip or spray coating methods. If desired, a modified liquid smoke composition may be applied to one surface of the casing, such as the outside surface thereof, and the casing can then be turned inside-out, to thereby provide a casing having a coating on the inside surface.

Food casings of the present invention may be provided in any of the forms known in the art, such as in the form of shirred casing sticks, discrete short segments of flattened casings, continuous lengths of flattened casing on a reel, and the like. It has been found that such casings may be stored for extended periods of time without being structurally degraded, or deteriorated by chemical action of the coating and when employed in the processing of a wide variety of food products, such casings will impart smoke flavor and/or color to the food product without the need for other well known smoking procedures.

The invention will become more clear when considered together with the following examples which are set forth as being merely illustrative of the invention and which are not intended, in any manner, to be limitative thereof. Unless otherwise indicated, all parts and percentages are by weight.

EXAMPLE 1

This example illustrates the preparation of a concentrated substantially neutralized liquid smoke composition.

1000 gms of "SMOKAROMA Code 10" (Meat Industry Suppliers Co.) liquid smoke is mixed with 250 gms of propylene glycol. To this solution is added 70 gms of sodium hydroxide. The substantially neutralized liquid smoke solution is then concentrated by evaporation in a low humidity environment to one-fifth of its original volume yielding a concentrated substantially neutralized liquid smoke solution with a pH of 6.2.

EXAMPLE II

This example illustrates the preparation of a concentrated liquid smoke composition.

1000 gms of "SMOKAROMA Code 10" liquid smoke is mixed with 250 gms of propylene glycol and then boiled to evaporate down to one-fifth of its original volume, yielding a concentrated liquid smoke solution having a pH of 4.5.

EXAMPLE III

This example illustrates the preparation of a smoke tars liquid smoke composition.

To 1000 gms of "SMOKAROMA Code 10" liquid smoke is added 70 gms of sodium hydroxide. A smoke tars precipitate forms and is separated by decanting off the supernatant liquid phase. From the precipitate 18.0 gms of the smoke tars are taken and are dissolved in 20.0 gms of propylene glycol yielding a smoke tars liquid smoke solution having a pH of 6.5.

EXAMPLE IV

This example illustrates the treatment of food casing with a concentrated substantially neutralized liquid smoke.

10 gms of the concentrated substantially neutralized liquid smoke of Example I is mixed with 5.0 gms of a 50% mineral oil in water emulsion as an antiblocking agent. The final mixture is then coated by slugging on the inside of a non-fibrous cellulosic dry casing stock at a level of 20.0 mg/sq. in. of casing surface. The coated casing is then dried to a water content of 12 wt% based on total weight.

EXAMPLE V

This example illustrates the treatment of food casing with a concentrated liquid smoke.

7.5 gms of the concentrated liquid smoke solution of Example II is further mixed with 6.2 gms of propylene glycol. The solution is then coated by slugging on the inside of a non-fibrous cellulosic dry casing stock at a level of 20.0 mg/sq. in. of casing surface. The coated casing is then dried to a water content of 12 wt% based on total weight.

EXAMPLE VI

This example illustrates the treatment of food casing with a smoke tars liquid smoke.

The 18.0 gms of smoke tars which were dissolved in 20.0 gms. of propylene glycol in Example III are further mixed with 20.0 gms of a 50% mineral oil in water emulsion as an antiblocking agent. The coating composition thus prepared is used to coat the inside surface of a non-fibrous cellulosic dry casing stock at a level of 20.0 mg. sq. in. of casing surface. The coated casing is then dried to a water content of 12 wt% based on total weight.

EXAMPLES VII–IX

These examples illustrate the preparation of fibrous cellulose casings by the methods of this invention.

The disclosures of Examples IV–VI, respectively, apply in these examples, except fibrous cellulosic casings are used in place of the non-fibrous cellulosic casings, and the coated casings are dried to a water content of 6 wt% based on total weight.

EXAMPLES X–XII

These examples illustrate the preparation of collagen casings by the methods of this invention.

The disclosures of Examples IV–VI, respectively, apply in these examples, except edible collagen casings are used in place of the non-fibrous cellulosic casing, and the coated casings are dried to a water content of 20 wt% based on total weight.

EXAMPLES XIII–XV

These examples illustrate the ability of the food casings treated in accordance with Examples IV–VI, respectively, to impart smoke flavor and smoke color to the surface of an encased processed meat product.

The non-fibrous cellulosic casings prepared as in Examples IV–VI, respectively, are conventionally shirred and conventionally humidified and then are stuffed with frankfurter emulsion. The frankfurters are further processed by steps well-known in the art, but without a conventional smoking step. The casings are then peeled from the finished frankfurters revealing smoke brown colored frankfurters with smoke flavor. Control samples stuffed in casings treated with "as is" liquid smoke and a water soluble thickening agent and processed under similar conditions do not have as intense a smoke flavor and color as those treated with the modified liquid smoke compositions.

EXAMPLES XVI-XXI

These examples illustrate the ability of the food casings treated in accordance with Examples VII-XII, respectively to impart smoke flavor and smoke color to an encased processed meat product.

The fibrous cellulosic casings prepared as in Examples VII-IX, respectively, and the edible collagen casings prepared as in Examples X-XII, respectively, are conventionally humidified and shirred and then are stuffed with bologna emulsion and frankfurter emulsion, respectively.

The bolognas and frankfurters are further processed by steps well-known in the art, but without a conventional smoking step. The fibrous cellulosic casings are then peeled from the finished bolognas revealing smoke brown colored bolognas with smoke flavor. Control samples stuffed in casings treated with "as is" liquid smoke and a water soluble thickening agent and processed under similar conditions do not have as intense a smoke flavor and color as those treated with the modified liquid smoke compositions. The collagen casings are not peeled from the frankfurters since the casings used are edible. However, the frankfurters do have a smoke flavor and color.

Although the present invention has been described and set forth in some detail, it should be further understood that the same is susceptible of changes, modifications and variations without departing from the scope and spirit of the invention.

What is claimed is:

1. An aqueous liquid smoke composition comprising a uniform mixture of smoke coloring and flavoring constituents, and an amount of a water soluble alcohol solubilizing agent sufficient to prevent said smoke constituents from separating out, said composition having greater than about 15% by weight of said smoke constituents, and having a pH greater than about 4.

2. The composition as claimed in claim 1 wherein said composition additionally comprises a salt of an alkaline neutralizing agent.

3. The composition as claimed in claims 1 or 2, wherein said composition is a solution.

4. The composition as claimed in claims 1 or 2, wherein said smoke constituents comprise components derived from a liquid smoke solution.

5. The composition as claimed in claims 1 or 2, wherein said smoke constituents comprise components derived from smoke tars.

6. The composition as claimed in claims 1 or 2, wherein said composition has a pH between about 6 and about 8.

7. The composition as claimed in claim 1 wherein said water soluble alcohol solubilizing agent is selected from the group consisting of ethyl alcohol, glycerine, propylene glycol, and triethylene glycol.

8. The composition as claimed in claim 1 wherein said composition additionally comprises a cellulose ether.

9. The composition as claimed in claim 8 wherein said cellulose ether is carboxymethyl cellulose.

10. The composition as claimed in claim 1 wherein said composition additionally comprises mineral oil.

11. A method of preparing an aqueous liquid smoke composition comprising concentrating a liquid smoke solution comprising smoke coloring and flavoring constituents in the presence of an amount of a water soluble alcohol solubilizing agent that is sufficient to maintain said smoke constituents in solution, whereby the resultant concentrated composition contains greater than about 15% by weight of said smoke constituents and has a pH greater than about 4.

12. The method as claimed in claim 11, wherein said liquid smoke solution is concentrated by boiling, whereby sufficient acidic constituents are boiled off to raise the pH of said composition to greater than about 4.

13. The method as claimed in claims 11, or 12, which additionally comprises substantially neutralizing said concentrated composition to a pH of about 6 to about 8 with an alkaline neutralizing agent in the presence of an amount of a water soluble alcohol solubilizing agent that is sufficient to maintain said smoke constituents in solution.

14. A method as claimed in claim 11 wherein said water soluble alcohol solubilizing agent is selected from the group consisting of ethyl alcohol, glycerine, propylene glycol, and triethylene glycol.

15. A method of preparing a concentrated aqueous liquid smoke composition comprising substantially neutralizing a liquid smoke solution comprising smoke coloring and flavoring constituents, to a pH greater than about 4 with an alkaline neutralizing agent in the presence of an amount of a water soluble alcohol solubilizing agent that is sufficient to maintain said smoke constituents in solution, and then concentrating the substantially neutralized liquid smoke, whereby the resultant concentrated substantially neutralized liquid smoke composition comprises greater than about 15% by weight of said smoke constituents.

16. The method as claimed in claim 15, wherein said neutralizing agent is used in an amount that is sufficient to maintain the pH of said composition between about 6 and about 8.

17. A method of preparing a concentrated liquid smoke composition comprising substantially neutralizing a liquid smoke solution comprising smoke coloring and flavoring constituents to a pH greater than about 4 with an alkaline neutralizing agent, whereby a precipitate of smoke tars is formed, separating the smoke tars precipitate from the supernatant liquid, and dissolving sufficent smoke tars in a water soluble alcohol solubilizing agent to form a smoke tars liquid smoke composition having greater than about 15% by weight of dissolved smoke tars.

18. The method as claimed in claim 17, wherein said neutralizing agent is used in an amount that is sufficient to substantially neutralize said liquid smoke solution to a pH between about 6 and about 8.

19. A tubular food casing comprising a tubular food casing including a coating having a pH greater than about 4 over a surface thereof, said coating comprising an admixture of smoke coloring and flavoring constituents in an amount of at least about 0.5 mg. per square inch of casing surface, and a water soluble alcohol solubilizing agent for said smoke constituents, wherein said casing is suitable to import smoke color and flavor to food products processed therein, and wherein a concentrated liquid smoke composition comprising greater than about 15% by weight of said composition of said smoke constituents.

20. The casing as claimed in claim 19 wherein said coating additionally comprises a salt of an alkaline neutralizing agent.

21. The casing as claimed in claim 19, wherein said smoke constituents are present in said admixture in an amount of at least about 3 mg. per square inch of casing surface.

22. The casing as claimed in claim 19, wherein said coating has a pH between about 6 and about 8.

23. The casing as claimed in claim 19, wherein said casing is a collagen casing.

24. The casing as claimed in claim 19, wherein said casing is a polyvinyl alcohol casing.

25. The casing as claimed in claim 19, wherein said casing is a cellulose ether casing.

26. The casing as claimed in claim 19, wherein said casing is a cellulosic casing.

27. The casing as claimed in claim 26, wherein said casing is a fibrous cellulosic casing.

28. The casing as claimed in claim 26, wherein said casing is a non-fibrous cellulosic casing.

29. The food casing as claimed in claim 19 wherein said water soluble alcohol solubilizing agent is selected from the group consisting of ethyl alcohol, glycerine, propylene glycol, and triethylene glycol.

30. The casing as claimed in claim 19 wherein said coating additionally comprises mineral oil.

31. A method of preparing the composition of claim 21, comprising concentrating a liquid smoke solution comprising smoke coloring and flavoring constituents in the presence of an amount of a water soluble alcohol solubilizing agent that is sufficient to maintain the smoke constituents of said liquid smoke solution in solution, whereby the concentrated composition so formed comprises greater than about 15% by weight of said smoke constituents.

32. A tubular food casing comprising a tubular food casing selected from the group consisting of a fibrous cellulosic casing, a collagen casing, and a polyvinyl alcohol casing, said casing having a coating over a surface thereof comprising an admixture of smoke coloring and flavoring constituents in an amount of at least about 0.5 mg. per square inch of casing surface, and a water soluble alcohol solubilizing agent for said smoke constituents, wherein said casing is suitable to impart smoke color and flavor to food products processed therein, and wherein said casing was manufactured by coating on a surface thereof, a concentrated liquid smoke composition comprising greater than about 15% by weight of said composition of said smoke constituents.

33. The casing as claimed in claim 32, wherein said composition also comprises a water soluble alcohol solubilizing agent for said smoke constituents.

34. The casing as claimed in claim 32 wherein said water soluble solubilizing agent is selected from the group consisting of ethyl alcohol, glycerine, propylene glycol, and triethylene glycol.

35. The casing as claimed in claim 32 wherein said coating additionally comprises mineral oil.

* * * * *